United States Patent [19]
Hughes

[11] 3,754,570
[45] Aug. 28, 1973

[54] SAFETY CONTROL FOR FLUID PRESSURE REGULATORS

[75] Inventor: George C. Hughes, Anderson, Ind.,

[73] Assignee: Textron Inc., Providence, R.I.

[22] Filed: June 20, 1972

[21] Appl. No.: 264,535

[52] U.S. Cl............ 137/613, 137/505, 137/505.46, 137/512.3, 137/516.25, 251/333
[51] Int. Cl............................................. F16k 15/02
[58] Field of Search...................... 137/505, 505.47, 137/505.46, 512, 512.3, 516.25, 516.27, 613; 251/212, 332, 333, 334

[56] References Cited
UNITED STATES PATENTS
3,425,442  2/1969  Johnson..................... 137/505.46 X
3,576,193  4/1971  Rothfuss........................ 137/613 X
3,613,725  10/1971  Hughes........................ 137/512.3 X

*Primary Examiner*—Harold W. Weakley
*Attorney*—Arthur A. Johnson

[57] ABSTRACT

A safety control for fluid pressure regulators having primary valve means for normally controlling the flow of high pressure fluid downstream and an auxiliary flow control means for restricting downstream fluid flow in the event that foreign matter or structural defects in the orifice or valve seat of the primary valve means prevents the valve from completely sealing off the flow of fluid or locking up under the action of the regulator, the primary orifice yielding to permit the auxiliary valve seat means to function and eliminate the need to discharge into the surrounding air a large volume of fluid, such as gas, through the usual vent in the regulator.

6 Claims, 6 Drawing Figures

SAFETY CONTROL FOR FLUID PRESSURE REGULATORS

Occasionally foreign matter in the fluid or structural failure or defects in the valve means prevents the valve seat from completely closing or locking up. Fluid would continue to flow through the valve, for example, if it was held open by foreign matter, and cause a large volume of fluid to pass through the valve and flow downstream of the regulator. This resulted in an overpressure in the regulator so that a large amount of fluid would be discharged through a pressure-responsive vent in the regulator which may cause a serious hazard in certain installation areas.

Several arrangements to prevent this difficulty have been proposed in my U.S. Pat. No. 3,613,725 in which auxiliary valve means controls the downstream flow of fluid in case of failure of the primary valve means to function as intended.

The present invention overcomes this difficulty by providing other novel constructions of the valve means including a primary orifice which is resiliently mounted and an auxiliary orifice which is fixed so that the valve seat, should foreign matter or other failure of the valve seat prevent the valve from closing, will act with the auxiliary orifice to restrict the downstream flow of high pressure fluid and thus reduce the pressure in the downstream line and also prevent the build-up of pressure in the regulator which would cause large volumes of fluid to be discharged through the usual regulator vent.

This is accomplished in one form of the invention by a novel valving construction in which a primary orifice sleeve is slidable in a valve port bushing and is normally resiliently urged by a spring to a position projecting from the bushing in which it may be engaged by a valve seat. In the event that there is a valve failure or that foreign matter comes between the valve seat and the end of the orifice sleeve so as to prevent the valve from being closed, the overpressure on the regulator diaphragm will cause the valve seat to press against the obstruction on the sleeve and move the latter inwardly against the tension of the spring so that an auxiliary orifice on the orifice bushing will cooperate with the valve seat to restrict the passage through the sleeve to the flow of fluid. The auxiliary orifice and said valve seat therefor may completely seal the flow of fluid downstream when the pressure exceeds a predetermined value.

The auxiliary orifice means may be an integral part of the valve port bushing or it may be a separate sleeve secured to and extending from the bushing, and in either case it is positioned to cooperate with an auxiliary valve seat operated by the regulator diaphragm.

In another form, the orifice sleeve bushing may have a peripheral edge surface to engage a matching surface on a beveled valve seat.

Other features and advantages of the invention will be apparent from the specification and claims when considered in connection with the accompanying drawings in which:

Figure 1:
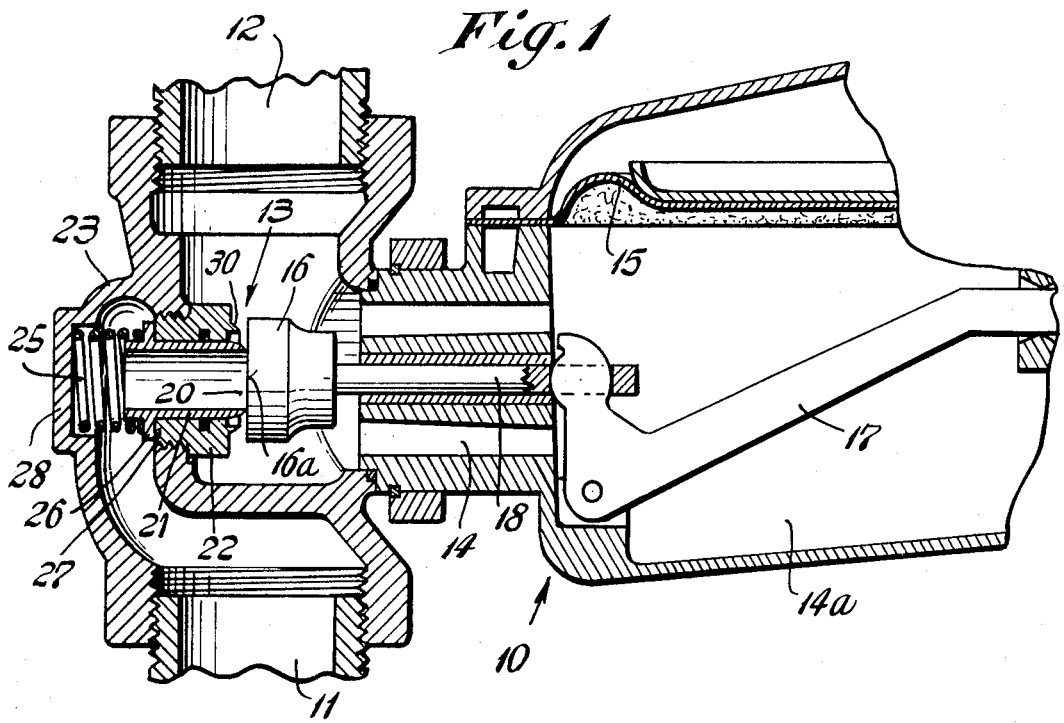
FIG. 1 shows a sectional view of the valve portion of the regulator in normal closed positions.

As shown in the drawings, the fluid pressure regulator 10 has an inlet 11, outlet 12, and a valve means 13 for controlling the flow of fluid between the inlet and outlet and also has a passage 14 communicating the outlet passage with a regulator pressure chamber 14a which is closed by the usual flexible pressure-responsive diaphragm 15 and in which a valve seat 16 is actuated by a bell crank 17 operating on a valve stem 18 for moving the valve seat 16 into a partially closed or a sealing position with the orifice 20 as shown in FIG. 1 in response to the amount of pressure in the pressure chamber of the regulator.

For the purpose of illustrating the present invention, the failure of the valve means will be described as occurring because of the presence of particles of foreign matter between the valve seat and orifice. As shown in the drawings, the valve means 13 includes a sleeve 21 slidably mounted in a bushing 22 carried by the valve housing 23 of the regulator. The end of the sleeve 21 has a chisel edge 24 forming the orifice 20. The sleeve 21 is normally urged by a coiled spring 25 to a projecting position shown in FIG. 1 in which a flange 26 on the sleeve 21 engages the inner end 27 of the bushing 22. The spring 25 is disposed between the flange 26 and housing portion 28. According to the present invention, the coils are spaced apart a sufficient distance so as never to appreciably restrict the flow of fluid through the valve means.

Figure 2:
FIG. 2 is a slightly enlarged view of the valve section of FIG. 1 showing a particle of foreign matter between the valve seat and the end of the orifice sleeve.

When the valve seat 16 is in the position of FIG. 1, its center portion 16a engages the circular edge 24 on the end of the sleeve 21 closing the orifice 20 and the flow of fluid is stopped and the valve means being in its sealed or locked-up position. However, should a particle P, FIG. 2, (greatly enlarged) of foreign matter be lodged between the valve seat 16 and the circular edge 24 of the sleeve 21 which projects beyond the bushing 22, it will prevent closing of the passage between the orifice 20 and the valve seat 16, as shown in FIG. 2. Continued pressure by the valve seat 16 on the sleeve 21, caused by the diaphragm 15 and bell crank 17, will overcome the pressure of the spring 25 and cause it to yield and allowing the orifice sleeve 21 to recede within the bushing 22, but still a gap caused by the particle P remains between the orifice 20 and the seat 16 allowing the fluid pressure on the diaphragm to increase. Such a condition is shown in FIG. 2. However, before the pressure of the fluid increases substantially, according to the present invention, auxiliary orifice means is approached and engaged by the valve seat 16 to stop the flow of fluid into the orifice sleeve 21.

Figure 3:
FIG. 3 shows the primary orifice held open by foreign matter, the auxiliary orifice means being closed thus stopping the flow of the fluid through the valve.

For this purpose, as shown in FIGS. 1 and 2, the orifice bushing 22 has auxiliary orifice means 29 comprising a chisel-like circular ridge 30 spaced from and surrounding the chisel-like edge 24 of the sleeve 21 forming the orifice 20, and the valve seat 16 has a sufficiently large diameter to provide an annular surface 16b so that when the sleeve 21 recedes under pressure from the valve seat 16, the surface 16b approaches the ridge 30 more or less to regulate the downstream pressure of the fluid. If, ultimately, the downstream pressure rises excessively, the orifice means 29 is closed by surface 16b of the valve seat 16, as shown in FIG. 3, against the passage of fluid. An O-ring 31 prevents leakage of fluid between the bushing 22 and the sleeve 21.

It will be seen, therefore, that the described novel safety control has a valving structure that will stop or greatly reduce the flow of fluid and prevent fluid discharge through the vent of the regulator without any serious danger.

Figure 4:
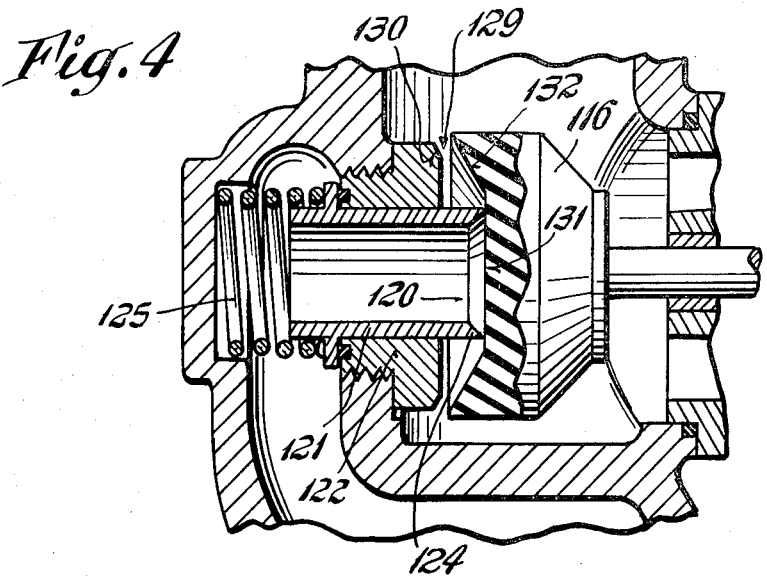
FIG. 4 is a view similar to FIG. 3 of another form of the invention.

In the form of the invention shown in FIG. 4, the orifice sleeve 121 and its chisel-like edge 124 are urged to projected position by spring 125 as in FIGS. 1, 2 and 3 but instead of having an auxiliary circular ridge 30, the bushing 122 has an outer beveled edge 130 forming an orifice 129, while the valve seat 116 has a cavity forming a bottom seat 131 for the orifice 120 and a beveled seat 132 to engage the beveled edge 130 of the bushing 122.

If an obstruction becomes lodged between the surface 131 of the valve seat 116 and the edge 124 on the sleeve 121, the sleeve 121 will recede and allow movement of the beveled seat 132 toward the beveled edge 130 to control the flow of fluid and stop it should the pressure become excessive. The valve seat 116 may, as indicated in FIG. 4, be made of rubber or suitable elastomeric material.

Figure 5:
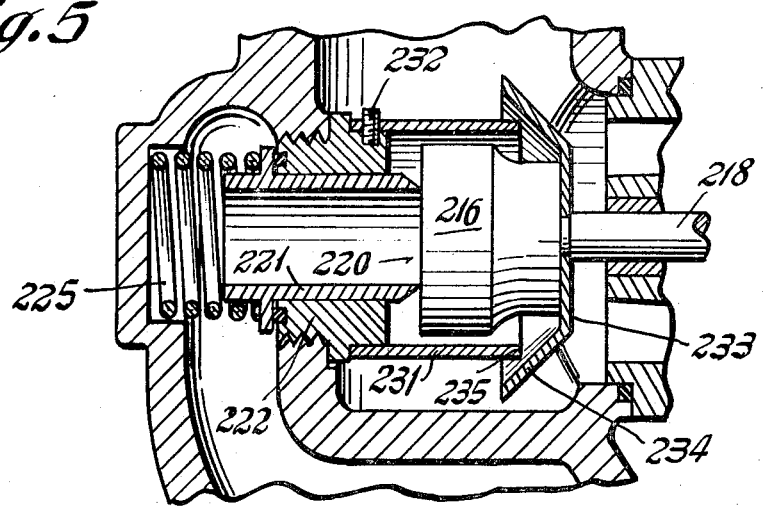
FIGS. 5 and 6 are enlarged sectional views of further modified forms of the invention.

In the form of the invention shown in FIG. 5, the orifice bushing 222 has secured to it a collar 231 by a screw 232 and the valve stem 218 carries a valve seat 216 adapted to cooperate with the orifice 220. The sleeve 221 is held in normal position by a coil spring 225. The valve stem 218 carries a valve cap 233 having a flared portion 234 surrounding but spaced from part of the valve seat 216 and the end of the collar 231.

If an obstruction should become lodged between the orifice sleeve 221 and the valve seat 216, the spring 225 will yield and the orifice sleeve 221 will recede. During such recession of the sleeve 221, the valve cap 233 will advance toward the end 235 of the sleeve 231 and regulate the downstream pressure in the regulator, ultimately stopping the flow of fluid by engagement with the end 235 of the sleeve 231, if the fluid pressure becomes excessively high.

Figure 6:
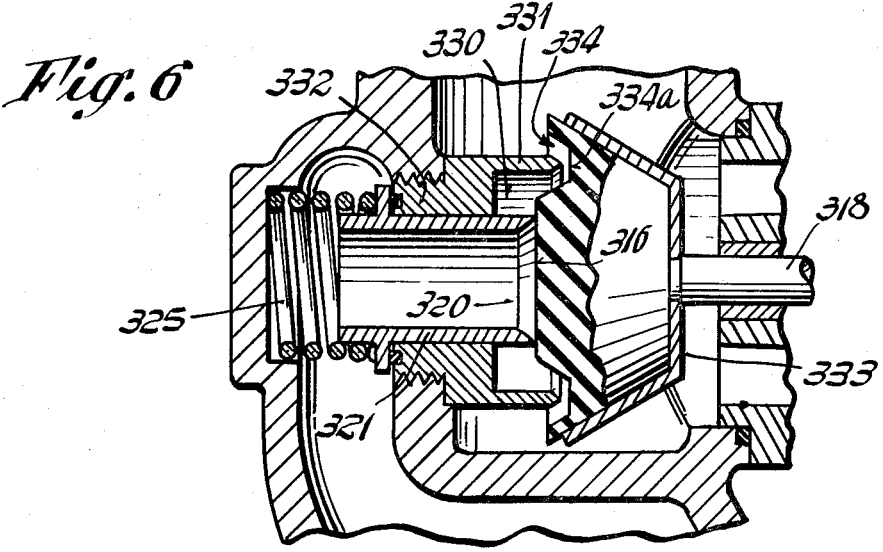

In the form of the invention shown in FIG. 6, the orifice sleeve 321 has an orifice 320 for cooperation with a valve seat 316 carried by a valve cap 333 mounted on a valve stem 318.

If an obstruction should lodge between the orifice 320 and the valve seat 316, the sleeve 321 will be caused to recede against the tension of spring 325 and thus will not control the pressure of the fluid flow downstream. However, as shown in FIG. 6, there is an auxiliary orifice 330 which is formed by a collar 331, in this form, integral with the bushing 332 and an auxiliary valve seat 334 carried by the valve cap 333 and valve stem 318.

If foreign matter should become lodged between the orifice 320 and the valve seat 316, the sleeve 321 will recede in the bushing allowing the bottom 334a of a recess in the valve seat 334 to cooperate with the circular ridge 324 of the orifice 330 in regulating the downstream pressure of the fluid, but if the pressure becomes excessive, the valve stem 318 will cause the bottom 334a of the recess to engage the valve seat 334 of the circular ridge 324 and stop the flow of fluid downstream of the regulator.

The valve seats 316 and 334 may be composed of rubber or other elastomeric material.

Variations and modifications may be made within the scope of the claims and portions of the improvements may be used without others.

I claim:

1. A safety control for fluid pressure regulators having a housing having an inlet and an outlet for fluid, a pressure-responsive diaphragm in the housing and valving means responsive thereto for controlling the flow of fluid between said inlet and outlet, said valving means comprises a sleeve having an end defining an orifice, a bushing in said housing in which said sleeve is slidably mounted, resilient means normally urging said end of the sleeve to a position projecting from said bushing, valve seat means for engaging the projecting end of the sleeve to close said orifice in response to a predetermined pressure of the fluid in the regulator, increased pressure in said regulator above said predetermined pressure, due to failure of said valve seat to shut off the orifice, causing the valve seat to move said movable orifice sleeve against the pressure of said resilient means, the improvement comprising auxiliary cooperating valve means on said bushing and on said valve seat means operable responsive to said movement of said sleeve to cause restriction of the flow of fluid through the sleeve and thus the reduction of the fluid pressure downstream in the regulator and ultimately shut off fluid flow if said pressure rises substantially above said predetermined pressure.

2. The invention as defined in claim 1 in which said auxiliary valve means comprises a ridge on the bushing surrounding the projecting end of the sleeve, and said valve seat means has a central portion positoned to engage the end of said sleeve and an annular portion to engage said ridge and shut off the flow of fluid through the sleeve when said projecting end of the sleeve recedes into the bushing without shutting off the flow of fluid through said sleeve.

3. The invention as defined in claim 1 in which said auxiliary valve means comprises a beveled peripheral edge on said bushing and said sleeve projects substantially beyond said beveled edge, and said valve seat means comprises a central portion positoned to engage said end of said sleeve and a beveled portion surrounding said central portion and positioned to engage said beveled peripheral portion of said bushing when said projecting end of said sleeve recedes into the bushing without shutting off the flow of fluid through said sleeve.

4. The invention as defined in claim 1 in which said bushing has a collar which projects substantially beyond the end of said sleeve and said valve seat means has a central portion positioned within said collar to cooperate with the end of said sleeve to control the flow of fluid to said sleeve, said auxiliary valve means comprising a dish-shaped valve cap having an inclined rim portion normally spaced from said end of the collar and positioned to engage the end of said collar and shut off flow of fluid to said sleeve if the projecting end of the sleeve recedes into the bushing without shutting off the flow of fluid through said sleeve.

5. The invention as defined in claim 1, in which said bushing has a collar which projects substantially beyond the end of said sleeve, and said valve seat means having a body provided with a central portion positioned within said collar to cooperate with the end of said sleeve to control the flow of fluid to said sleeve, said body comprising an annular portion normally spaced from said end of the collar, and positioned to engage the end of said collar and shut off flow of fluid to said sleeve if the projecting end of the sleeve recedes inwardly of said bushing without shutting off the flow of fluid through said sleeve, said body being formed of elastomeric material, and a rigid valve cap in which said body lies.

6. The invention as defined in claim 4 in which said bushing has a collar projecting substantially beyond the end of said sleeve.

* * * * *